US010674713B2

(12) United States Patent
Teunissen

(10) Patent No.: US 10,674,713 B2
(45) Date of Patent: Jun. 9, 2020

(54) COLLAPSIBLE POULTRY PERCH SYSTEM, DEVICE AND METHOD OF USE

(71) Applicant: Matthew E Teunissen, Cedar Grove, WI (US)

(72) Inventor: Matthew E Teunissen, Cedar Grove, WI (US)

( * ) Notice: Subject to any disclaimer, the term of this patent is extended or adjusted under 35 U.S.C. 154(b) by 202 days.

(21) Appl. No.: 15/853,758

(22) Filed: Dec. 23, 2017

(65) Prior Publication Data
US 2019/0116765 A1  Apr. 25, 2019

Related U.S. Application Data

(60) Provisional application No. 62/576,832, filed on Oct. 25, 2017.

(51) Int. Cl.
*A01K 31/12* (2006.01)
*A01K 39/014* (2006.01)

(52) U.S. Cl.
CPC ............ *A01K 31/12* (2013.01); *A01K 39/014* (2013.01)

(58) Field of Classification Search
USPC .......... 119/57.8, 487, 531, 52.2, 51.01, 61.1, 119/57.2, 57.1, 402, 429, 449, 70, 52.1; D30/131; 248/200, 205.1, 214, 215, 247, 248/248, 300, 301, 251
See application file for complete search history.

(56) References Cited

U.S. PATENT DOCUMENTS

| | | | | | |
|---|---|---|---|---|---|
| 2,892,604 | A | * | 6/1959 | Keen | A01K 39/014 248/125.3 |
| 3,446,325 | A | * | 5/1969 | Robbins, Jr. | A01K 7/00 193/25 R |
| 3,593,470 | A | * | 7/1971 | Francis | E06B 7/28 52/36.4 |
| 4,892,061 | A | * | 1/1990 | Steudler, Jr. | A01K 39/02 119/72.5 |
| 5,429,071 | A | * | 7/1995 | Altman | A01K 5/0142 119/61.1 |
| 2003/0080262 | A1 | * | 5/2003 | Kanen | F21V 21/112 248/200 |
| 2005/0230577 | A1 | * | 10/2005 | Chen | A47B 55/02 248/215 |
| 2009/0114160 | A1 | * | 5/2009 | Hung | A01K 39/01 119/61.3 |
| 2010/0059641 | A1 | * | 3/2010 | Twesme | F24S 25/33 248/205.3 |
| 2012/0055410 | A1 | * | 3/2012 | Cote | A01K 39/0113 119/52.3 |
| 2015/0342153 | A1 | * | 12/2015 | Hudepohl | F16M 13/022 119/57.8 |

* cited by examiner

*Primary Examiner* — Andrea M Valenti
(74) *Attorney, Agent, or Firm* — Leres Patent & Technology, LLC; Mandy T. Garrels

(57) ABSTRACT

A separately attachable poultry perching system and device, specifically to be utilized with long poultry feed troughs hung from barn rafters. The device comprising separately attachable and detachable components for assembly onto an already assembled and in place poultry feed trough device and system.

4 Claims, 6 Drawing Sheets

COLLAPSIBLE POULTRY PERCH SYSTEM, DEVICE AND METHOD OF USE

CROSS REFERENCE TO RELATED APPLICATIONS

This application claims priority benefit of provisional patent application, 62/576,832, having the filing date of Oct. 25, 2017, which is incorporated by reference in the entirety herein.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark office, patent file or records, but otherwise reserves all copyright rights whatsoever.

BACKGROUND OF THE INVENTION

Field of the Invention

A separately attachable poultry perching device and system, specifically for use with a hexagonal shaped pully wired poultry feed trough.

Background

Large scale production and retail distribution of free range and cage free poultry eggs are held to special regulation for certification standards. Detailed management standards for laying hens are outlined by the Humane Farm Animal Care Animal Care Standards, Egg Laying Hens (2017 Standards). These rules are regularly updated to meet the evolving technology and goals. While the topics are outlined separately in the regulations, actual management practices are very much intertwined in their design and effect on the farm. The design of an egg laying operation that meets certification standards can be challenging to achieve. There are limitations among existing equipment technology which makes for cumbersome and inefficient work. Indoor feed systems must be raised above the seated ground by a given height and separated from each other by required distance. Due to frequent cleaning of debris underneath the feed trough, current trough systems are designed to be hung from a barn roof for raising by pully system during cleaning phase and to be lowered back into position after cleaning is completed. This design is currently the accepted standard design within the industry for meeting certification requirements. The design offers an acceptable level of efficiency on the farm, minimizing the amount of labor needed to organize the barn for cleaning.

Apart from regulation that controls practices relating to indoor feeding are requirements pertaining to the design of indoor perching. According to the Humane Farm Animal Care Animal Care Standards, Egg Laying Hens (2017 Standards), at least 20% of all perches must be elevated above the floor space by a minimal distance (more than 16" and under 1 meter above the floor space) and accommodate a certain density of hens per square foot space. It is likely soon with rule amendments that 100% of perches will need to be elevated above floor space for improved conditions as commercial demand grows. Perches must further sufficiently accommodate 6" of perch length per hen for the given density of hens within the barn area. Round perch bars must be at least 1" in diameter and no greater than 3" round, without sharp edges and having no less than 0.5" gap space on either side to allow for proper and safe gripping.

Existing perching equipment are not designed to coordinate well with the standard pully-lift feed equipment. One existing perch design comprises lengths of perch bars separately held on pully lift lines connected to barn rafters. By this design, both perch bars and feed troughs are lifted up to rafter level for proper barn clearance when tall tractor equipment must be brought to clean the barn. The total weight of suspended feed troughs together with the weight of suspended perch bars weigh heavily on barn roof rafters, significantly wearing down the life span of barn infrastructure. Installation of this type of system is also more costly and cumbersome due to the need to install pully devices on the rafters. Any adjustment to the location or number of perch bars in the barn would require removal and reinstallation of pullies to meet design requirement. Precision of installation is further required as the location where the wires are installed on the rafter dictates their proximity to the troughs below. Wire suspended perch system is essentially costly, inefficient and inflexible to management.

Yet another alternative perch design provides an "A-frame" scaffolding system constructed around the feed trough to achieve elevation and spacing requirement. The perch bars are seated lengthwise along a scaffold device which raises the perch bars above ground in multi-tier fashion. When the bar is to be cleaned, the A-frame scaffolding device would be disassembled to enable pully-lift of the feed troughs and reassembled upon lowering of the troughs when cleaning is completed. This system is labor intensive and inefficient. Larger barns either require more units of this device to accommodate the lengths of feed trough and hen density, which in turn makes for more cumbersome assembly and disassembly process. Many individual hands are required to construct the A-frame scaffolding device around the hanging feed trough to avoid damage or injury to nearby equipment. A great deal of labor and work hours is expended by this design. Installers are further subjected to stay in the barn for longer periods of time, surrounded by unhealthy poultry manure and dust particles.

U.S. Pat. No. 3,050,030, filed Jun. 1, 1961, provides another feed trough and perch design disclosing a multi-tiered feed trough interconnected vertically above each other within an open crate environment and having perch stands connected thereto. This system is designed for hobbyist operation with smaller number of birds. The design itself would likely create too dense of an environment to properly conform with current stringent spatial requirements.

A considerable need remains for an inventive solution that improves upon indoor perch design and management systems that conforms with regulatory standards of the industry. There remains a need for a more efficient system of management, that is safer to handle, and has the capability of accommodating more than minimum certification requirements, particularly as the rules continue to become more stringent and as demand continues to grow.

All patents and applications referred herein are incorporated by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

SUMMARY OF INVENTION

The invention herein pertains to a separately attachable poultry perching system and device, specifically to be utilized with long poultry feed troughs hung from barn rafters. The device comprising separately attachable and detachable components for assembly onto an already assembled and in place poultry feed trough device and system. The particular poultry feed trough device and system contemplated by this application is a long feed trough that is hung from barn rafters by retractable or liftable pully means. The long feed trough preferably having a consistent cross-sectional shape along its length which may either be geometric or round in nature or a combination of both. The cross sectional shape of said poultry feed trough is preferably hexagonal in nature according to current standards but may also embody other geometric or rounded shapes. The device of this invention is intended to be easily and safely assembled by one or more individual, wherein the device by its separate components separately surround one or more ends of a long poultry feed trough in a yoke like manner. The device assists to lift the feed trough slightly off the ground surface, providing lift support and therefore alleviating pulling pressure against the barn rafter along the pully lines from where the troughs typically hang. At least two or more such device units are attached along the length of said long feed trough, cradling said feed trough securely and stably on the ground surface while allowing for a taught connection between the pully lift system and the top portion of the feed trough. The combined affect comprising a pully line connection to the top of the feed trough which prevents tipping of the feed trough and further a ground support system in the device to provide stability and alleviate wear against the barn rafters.

The device of this invention further providing means for attaching perch bars parallel to the length of said long feed trough. Each said device unit further comprising a flat planar piece serving as a bridge which fits within said device unit and extends beyond the left and right sides of said device unit, extending a distance to the left and right side of said long feed trough. The bridge portion having a plurality of circular perforations therethrough of the same diameter as a perch bar. Wherein two or more device units being attached to said long feed trough, supporting said feed trough above the ground level in stable manner, and wherein further one or more perch bar is sleeved through at least one of said circular perforation of said bridge portion. Said one or more perch bar being supported above the ground surface at either side of said long feed trough and having minimum to no pull effect against the rafters along said pully lift system due to the ground-lift support provided by said two or more device units.

The device of this invention comprising a bracket portion, a bridge portion, and one or more perch bar. Said bracket portion comprising individual bracket units that each comprise two identically shaped plates (also referred to interchangeably as half bracket pieces). During assembly, each half of said two half bracket pieces are positioned to face each other in flush manner and wrap around the cross-section of a pentagonal shaped feed trough forming a yoke like support around the feed trough. Each of said two half bracket pieces are separately attachable and detachable from said feed trough without changing the position of said feed trough. This may be achieved by separately wrapping each half around the left and right sides of said feed trough cross section. The two half bracket pieces may comprise completely separate portions or alternatively interconnected at the top end by swivel connection. The ability to separate each half bracket piece from each other allows each bracket unit to be assembled and disassembled without disturbing surrounding equipment and safely by a single individual.

Each half bracket piece of said two half bracket pieces for each bracket unit further centrally having an indentation centrally on the same side edge, which may be the left or right side edge, comprising half the cross-sectional shape of said long feed trough. Each said half bracket piece also having an indentation at its each top end with the shape of a semi-circle. The indentations at the top end and centrally should be on the same side edge of the overall bracket piece. Each half bracket piece further having a first and second side. Said first side comprising a flat planar surface. Said second side comprising a flat surface and further providing a first planar ledge perpendicularly extending from said half pentagonal indentation and a second planar ledge perpendicularly extending from said bottom ledge forming a toe-hook.

The two half bracket pieces, when combined in overlapping manner around the cross section of said feed trough surrounds the feed trough much like a yoke, lifting said trough above the ground surface at a predetermined height. The first planar ledge of each of the combined half bracket pieces facing opposite direction away from each other, forming a horizontal shelf. Said horizontal shelf providing vertical support to the bottom surface of said feed trough. The second planar ledge of each of the combined half bracket pieces also facing opposite direction away from each other and forming a horizontal extension at the ground level, giving the device overall footing and stability. At the edge of each second planar ledge exists at least one perpendicular extension approximately but no greater than 1.5 inch wide, also referable as a toe-hook piece. Each said toe-hook piece is intended to be sleevable through a perforation on the ground surface. It is worthy to note that the ground surface of a typical indoor poultry bar comprises a raised grid flooring system with approximately 1 inch square perforations to allow collection of debris underneath. The ground surface, as referenced within the poultry management industry, refers to the supporting surface which may be raised above the actual ground level. The toe-hook as it is sleeved through the ground surface, helps to hold the overall device and system in more rigid position to prevent lateral shifting against movement of the hens. The toe-hook piece is in fact a small vertical piece extending perpendicularly from said bottom ledge. Said toe-hook piece is preferably not greater or less than 90 true vertical so as to avoid actual hooking and retention onto the perforated ground surface. This is important because the feed trough and device assembly are intended to be lifted together in tandem by said pully lift system and should be able to be removed and reset without interference or additional assistance. Each half bracket piece being identical in shape for ease of manufacturing, catalogue packaging and sale in parts.

Each device unit further comprising a bridge that is straight and flat in shape with holes strategically perforated centrally along its length. At either ends are U-shaped grooves or alternatively circular perforations. Each U-shaped groove or circular perforation is intended to accommodate a perch bar. Said U-shaped groove portion may cradle a perch bar while the semi-circle indentation of the top portion of a first half bracket wraps around a left side of said perch bar and a semi-circle indentation of the top portion of a second half bracket wraps around the right side of said perch bar. The effect comprising a perch bar being completely surrounded by a yoke feature and suspended above the feed trough by a pre-determined distance. The benefit of this particular design allows for a perch bar to be placed in suspension without actual sleeving of the bar through a hole but rather by mere assembly of the individual components of the device. The circular perforations along said bridge portion would require actual sleeving of said perch bar therethrough.

Essentially, the bridge portion being positioned between a first and second half bracket piece at the top end, surrounding a perch bar that is positionable and suspendable above said feed trough. The entire assembly of said bracket unit surrounding said feed trough and perch bar(s) is seatable above said ground surface while connected to said pully lift system. Upon full assembly, the components of said device of this invention (the two half bracket pieces and bridge surrounding said perch bar and feed trough) are removably connected in place by bolting or screwing means. Two parallel adjacent feed troughs may be tandemly connectable by a bridge portion between their respective bracket unit assemblies with at least two or more perch bars positionable through said bridge portion. Alternatively, each feed trough maintains its own stand-alone position but with one or more perch bar suspended parallel to its length by assembly of this invention.

Other features, advantages, and object of the present invention will become more apparent and be more readily understood from the following detailed description, which should be read in conjunction with the accompanying drawings.

DETAILED DESCRIPTION

Figure 1:
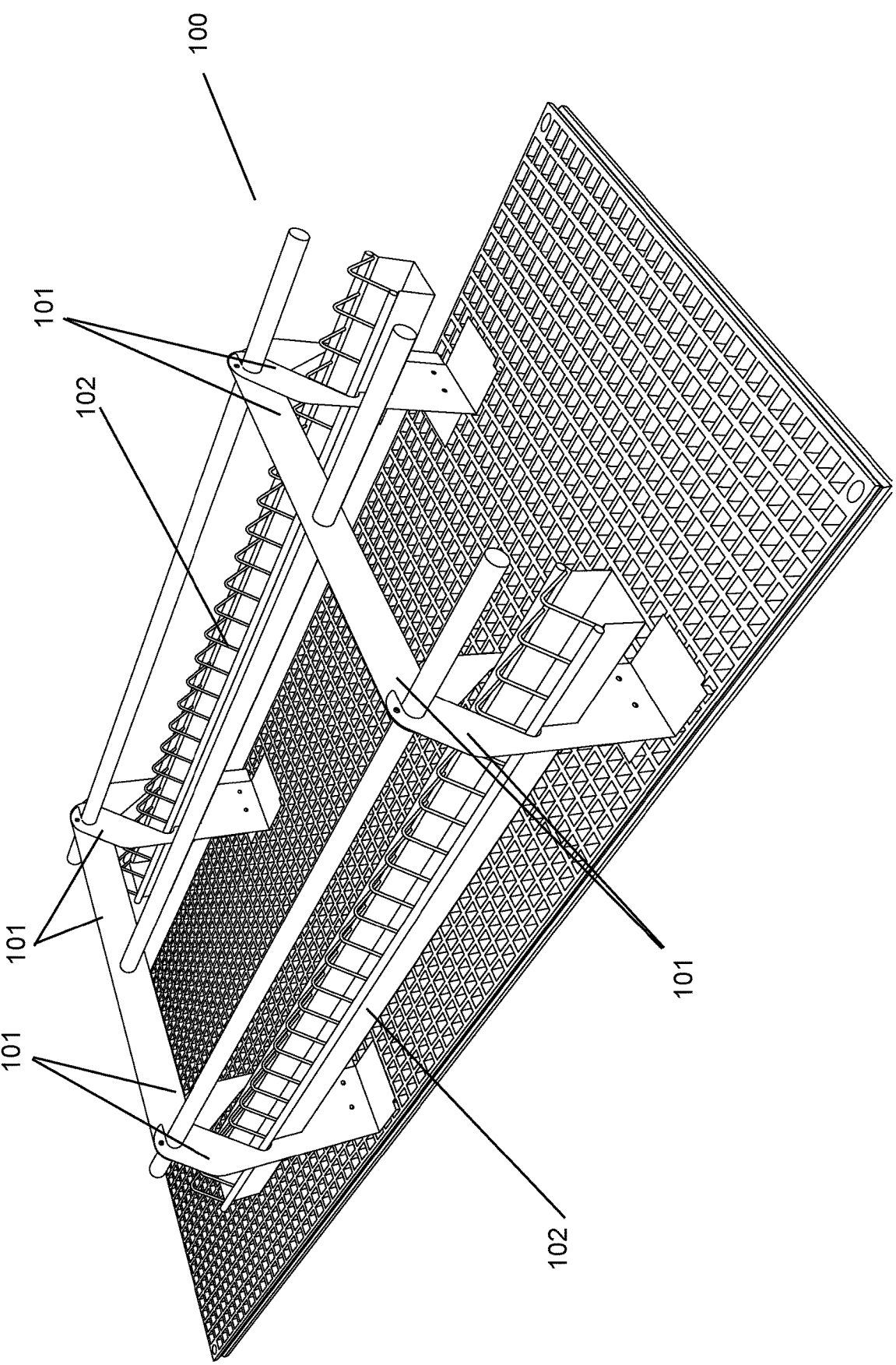
FIG. 1 provides a perpsective view illustration of a preferred embodiment of this invention.

A preferred embodiment of the invention herein is provided according to FIG. 1 wherein a poultry perch device and system 100 by its separate individual parts (see FIGS. 2 and 3) are removably attachable to form a yoke-like device 101 surrounding a long poultry feed trough 102. The device and system 100 are intended to be attachable to a long poultry feed trough 102 that is typically hung to barn rafters by a pull-lift system (see FIG. 6). The device and system 100 are intended to be attachable and removable to said pre-installed long poultry feed trough 102 without need to adjust the position of said pre-installed long poultry feed trough.

Figure 2:
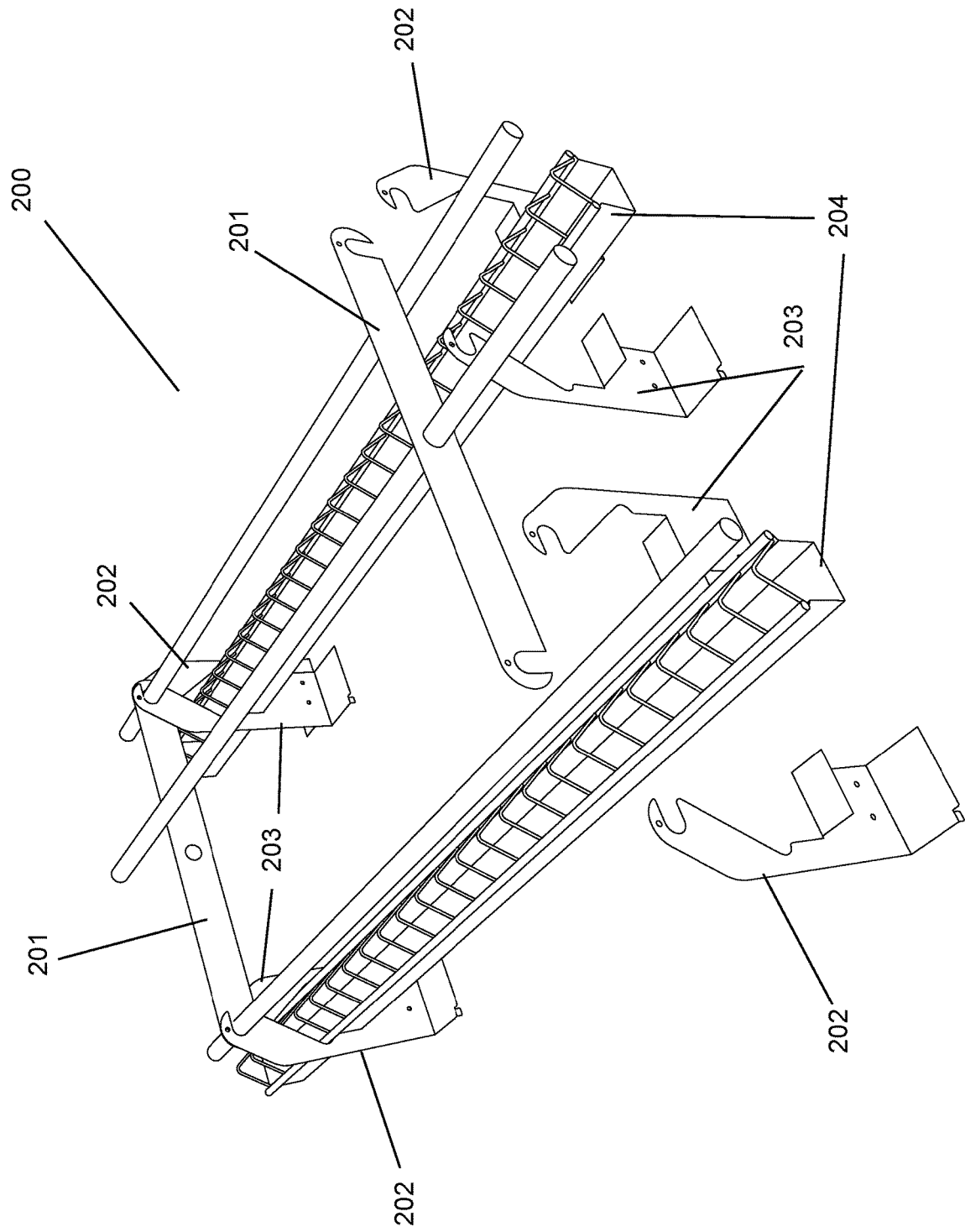
FIG. 2 provides a perspective view illustration of a preferred embodiment of this invention.

The device 200 according to FIG. 2, by its separate parts 201, 202, 203 coming together and surrounding the cross-section of said long poultry feed trough 204 to form a yoke-like cradle supporting said long poultry feed trough above the ground surface while relieving hanging pressure against the barn rafter. The device further having the capability of supporting lengths of perch bars parallel to the length of poultry feed trough by a bridge extension. The bridge extension further having the capability of interconnecting at least two long poultry feed troughs such that said at least two feed troughs together with attached perch bars may be tandemly raised by their each pully-lift system and means.

Figure 3:
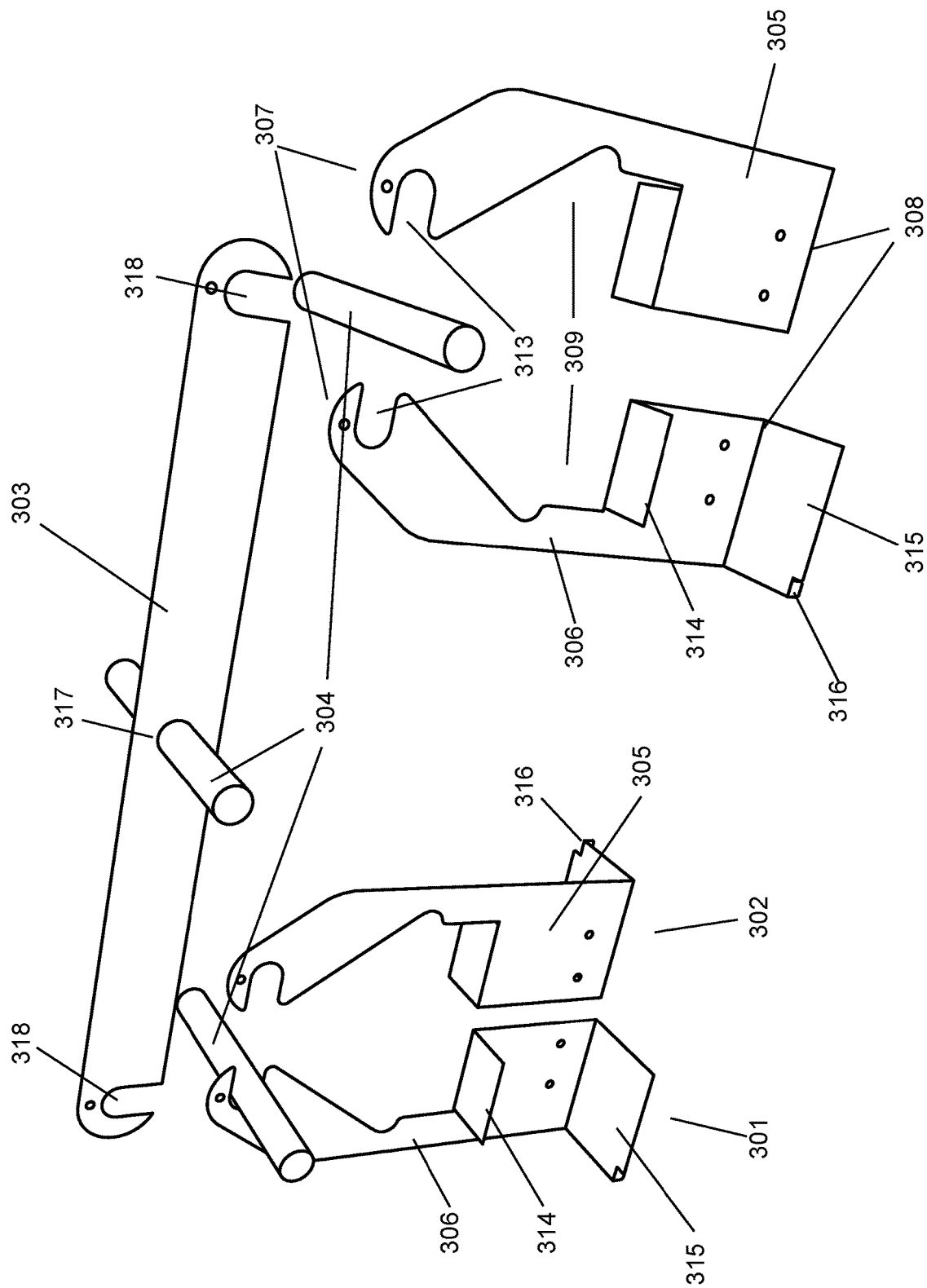
FIG. 3 provides a perspective view illustration of a preferred embodiment of this invention.

FIG. 3 provides illustration of a preferred embodiment of the invention herein comprising a poultry perch device and system 300 by its removably attachable components 301, 302, 303. Said poultry perch device comprising a pair of bracket units 301, 302, a bridge 303, and at least one perch bar 304. Each said bracket unit comprising two plates 301, 302. Each plate 301, 302 of said two plates 301, 302 having a first face 305 and second face 306. Each said plate 301, 302 of said two plates 301, 302 having a top round edge 307, bottom edge 308, a first side edge 309 and second side edge 310. Said top round edge 307 having a semi-circle indentation 311. Said first side edge 309 having an indentation 312 comprising half a pentagonal shape centrally positioned thereon. Note that the indentation 312 of said first side edge may not necessarily comprise the shape of a half pentagonal shape but may alternatively comprise any shape that snuggly fits the cross-section of a long poultry feed trough. Said top round edge 307 having a semi-circle indentation 313. Said first face 305 comprising a flat surface. Said second face 306 comprising a flat surface and further providing a first planar ledge 314 perpendicularly extending from said half pentagonal indentation 312 and a second planar ledge 315 perpendicularly extending from said bottom edge 308. Said second planar ledge 315 providing a downward hook forming a toe-hook 316. Said downward hook (or alternatively referred to as said toe-hook) 316 being no greater than 1.5 inch in width or diameter.

Said bridge 303 comprising a long and flat bar with at least one perforation 317 or indentation 318 therethrough or up to six perforations. Each perforation or indentation 317, 318 having equal radius with the said semi-circle indentation 311 of said top round edge 307. Each perforation 317 or indentation 318 further positioned equal distanced apart from each other along the length of said bridge by 14 inches between the center of each perforation or indentation. Depending on the choice of configuration, the two furthest ends of said bridge or alternatively the center of said bridge may comprise U-shaped indentations 318. The location of U-shaped indentation 318 serving as the point of attachment with said two half bracket pieces 301, 302 and where a perch bar 304 is further supported. The remaining perforations may comprise either U-shaped indentations 318 or alternatively full circular perforations therethrough 317. The U-shaped indentation 318 of said bridge portion 303 is preferably located at the location where the bracket unit comes together around the feed trough to enable assembly without adjustment of said pre-installed feed trough.

Figure 4:
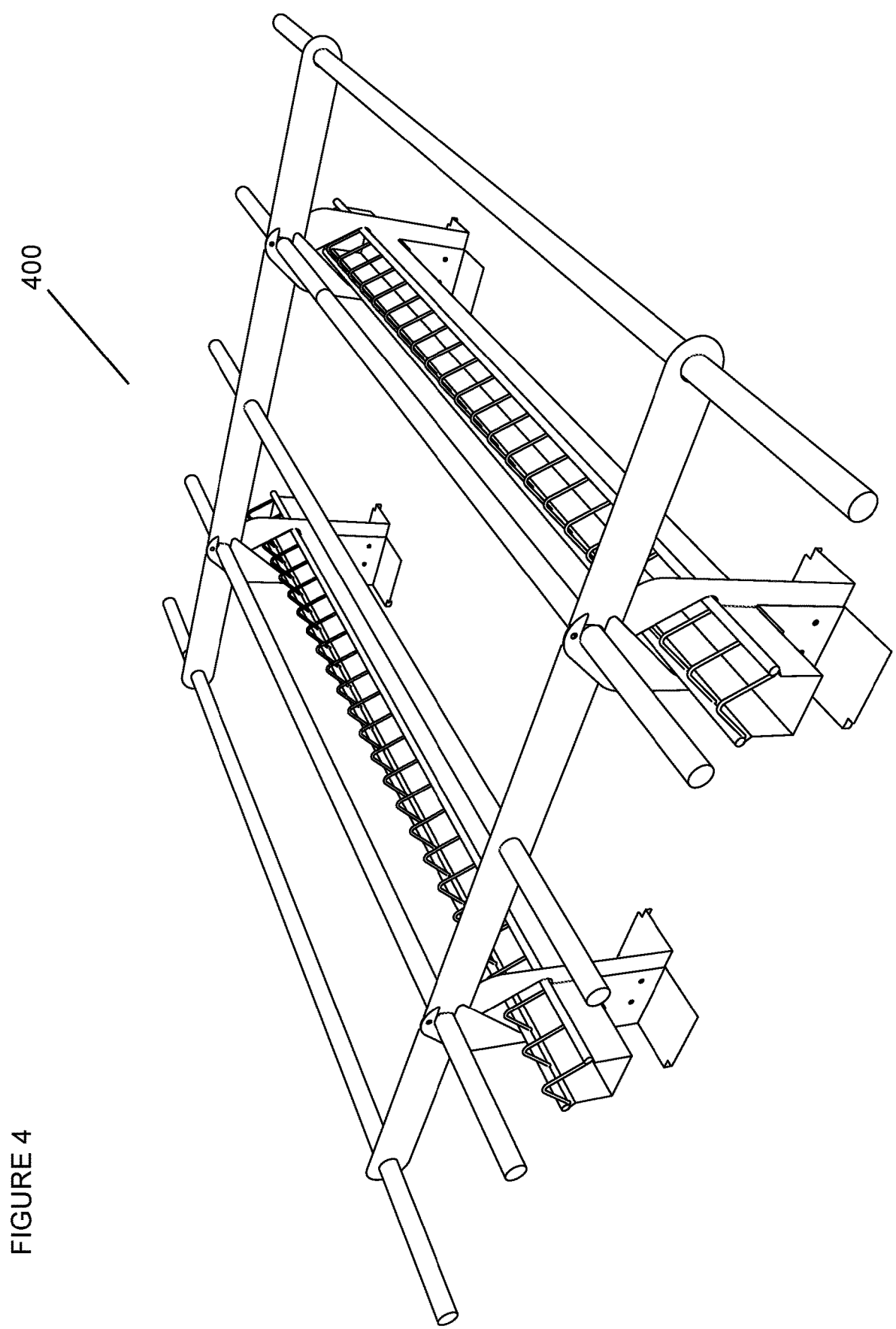
FIG. 4 provides a perspective view illustration of a preferred embodiment of this invention.
Figure 5:
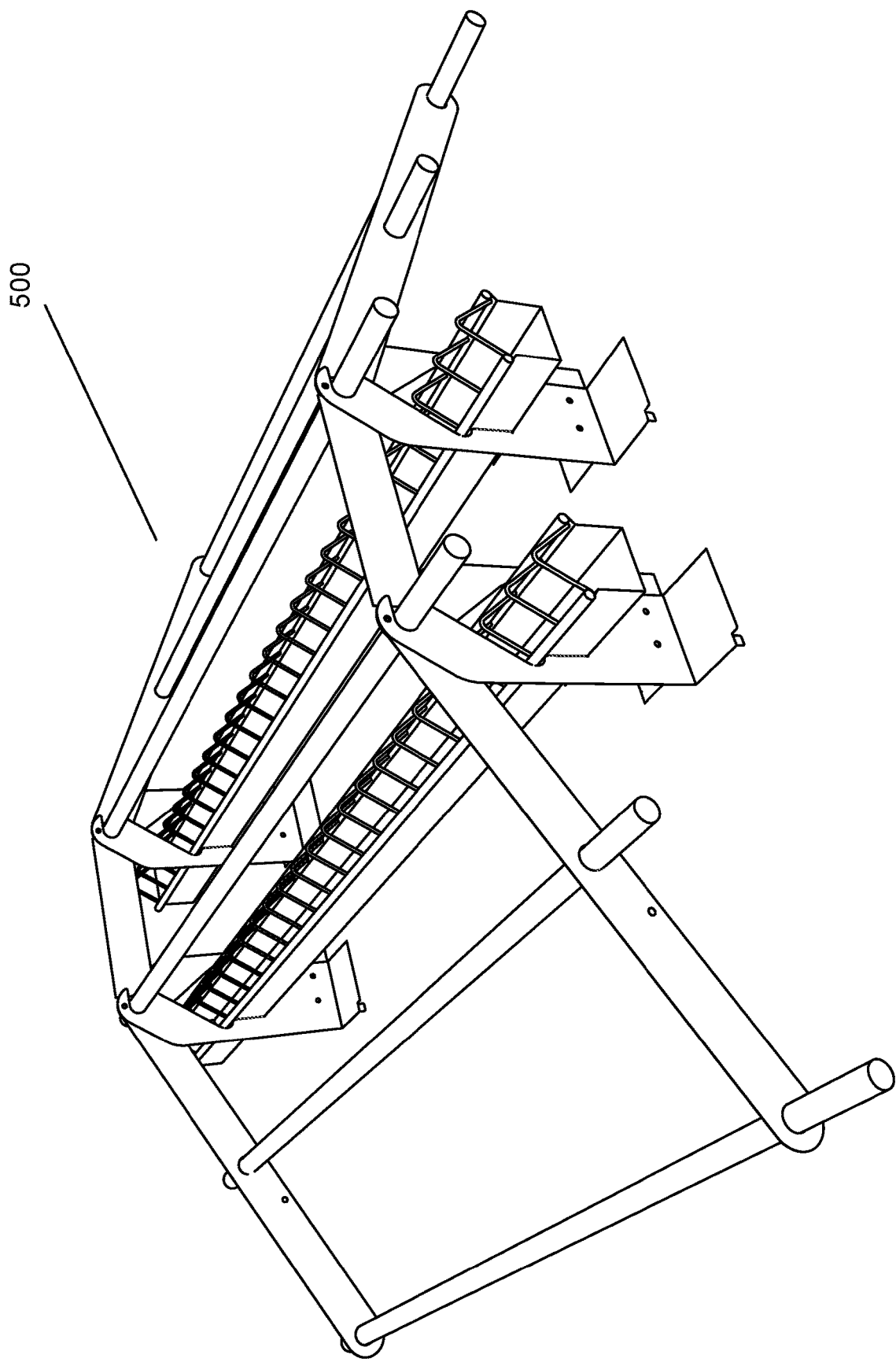
FIG. 5 provides a perspective view illustration of a preferred embodiment of this invention.

FIGS. 4 and 5 provide illustration of alternative embodiments of said bridge portion 400, 500 which may accommodate up to six perforations and alternatively may comprise an angular shape as well. The angular version 500 of said bridge portion may be oriented in either upward or downward direction. Once the bracket units are installed at the preferred locations along said one or more feed troughs, additional perch bars may be sleeved through the aligned perforation holes of said bridge portions.

Figure 6:
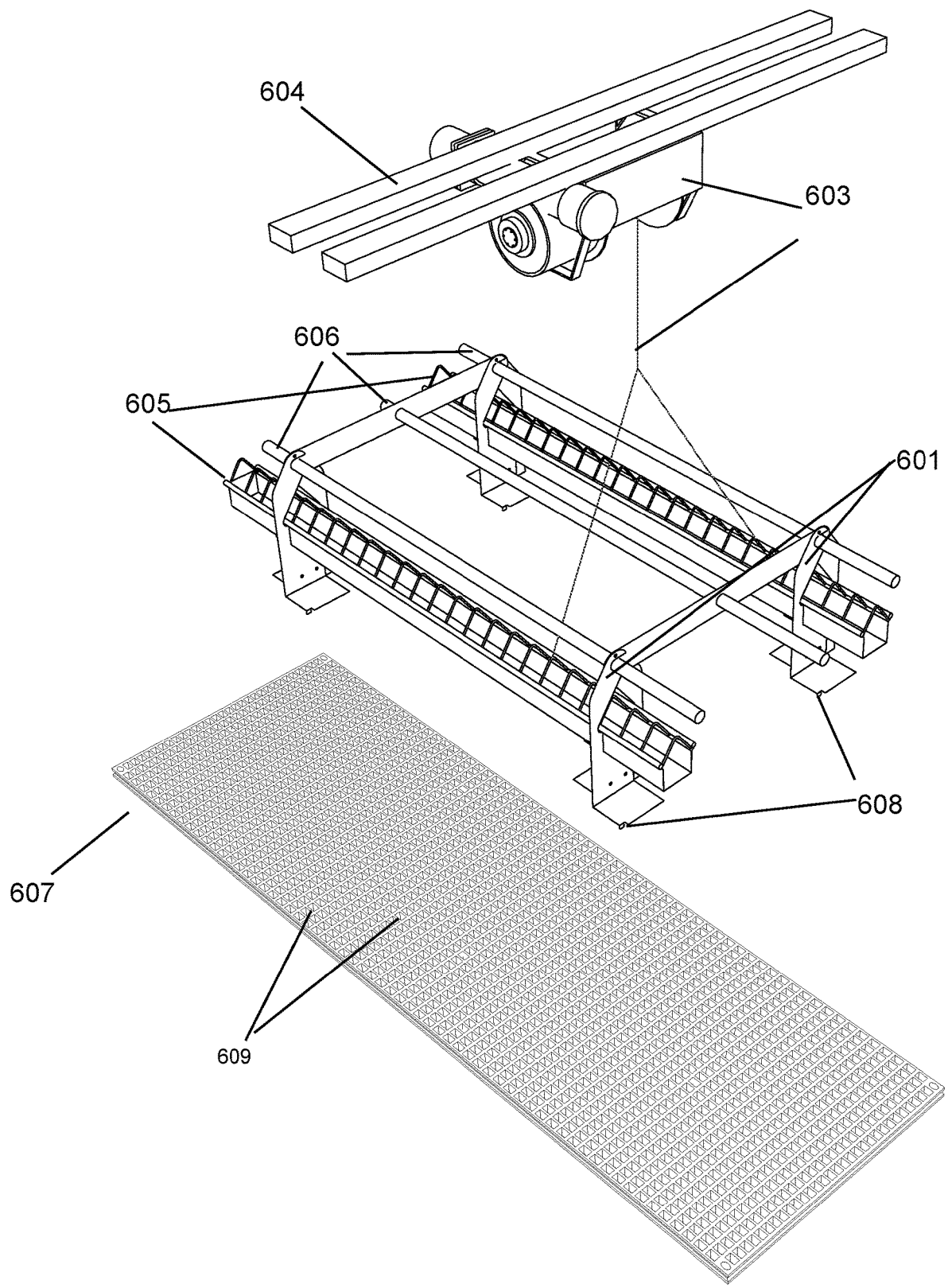
FIG. 6 provides a perspective view illustration of a preferred embodiment of this invention.

The system of this invention, as illustrated in FIG. 6, provides a method and device for constructing a poultry perch bar unit around a pre-installed liftable poultry feed trough device that is further tandemly liftable together with said poultry feed trough system 600. Said device 601 is attachable to said pre-installed feed trough device and system without need to adjust the position of said feed trough. The device easily assembles and disassembles around the in-place feed trough which is already attached to a pully-lift installation 603 connected to the barn rafter 604. Two or more feed troughs 605 and at least one or more perch bars 606 may be tandemly attached together such that when the pully-lift system 603 raises the attached feed troughs 605, the perch bars 606 are raised along together. When the entire combined system of this invention together with said pre-installed poultry feed trough 605 are lowered back to the ground level 607 by said pully-lift system 603, the device should easily seat back into place with said toe-hook 608 of each bracket unit 601 sleevable into the perforated holes 609 of said ground surface 607.

Having fully described at least one embodiment of the present invention, other equivalent or alternative methods according to the present invention will be apparent to those skilled in the art. The invention has been described by way of summary, detailed description and illustration. The specific embodiments disclosed in the above drawings are not intended to be limiting. Implementations of the present invention with various different configurations are contemplated as within the scope of the present invention. The invention is thus to cover all modifications, equivalents, and alternatives falling within the spirit and scope of the following claims.

The invention claimed is:

1. A poultry perch device comprising:
   a pair of bracket units, a bridge, and at least one perch bar,
   each said bracket unit comprising two plates,
   each plate of said two plates having a first face and second face,
   each said plate of said two plates having a top rounded edge, bottom edge, a first side edge, and second side edge,
   said top rounded edge having a semi-circle indentation,
   said first side edge having an indentation centrally positioned thereon,
   said first face comprising a flat surface
   said second face comprising a flat surface and further providing a first planar ledge perpendicularly extending from said centrally positioned indentation and a second planar ledge perpendicularly extending from said bottom edge,
   said second planar ledge providing a downward hook,
   said downward hook being no greater than 1.5 inch in width or diameter,
   said bridge comprising a long and flat bar with at least 3 perforations or indentations therethrough, each said perforation or indentation of said at least 3 perforations or indentations having a radius equal to the radius of said semi-circle indentation of said top rounded edge, each perforation or indentation of said at least 3 perforations or indentations adjacently positioned equal distance apart along said length of said bridge by at least 14 inches between their each centers, wherein a first plate and a second plate of said two plates of each said bracket unit surrounding the cross section of a poultry feed trough between the indentation of each said plate, said first and second plate flushly pressable against each other at their respective first flat sides, said bridge centrally positioned between the top rounded edge of said first and second plates such that a perch bar is suspendable by the matching radius of the top round edge semi-circle indentation of said first and second plates and said indentation of said bridge, said first plate and said second plate and said bridge being removably connectable to each other in assembled form.

2. The poultry perch device according to claim 1, wherein a perch bar is suspendable through two or more poultry perch devices in parallel manner to said feed trough.

3. The poultry perch device according to claim 1 wherein two or more poultry feed troughs are positionable in adjacent and parallel manner to each other such that two or more poultry perch devices are removably connectable along the length of each said poultry feed trough with at least one perch bar suspendable through each said two or more poultry perch devices in parallel manner to each said feed trough.

4. The poultry perch device according to claim 1 wherein said at least one poultry feed trough is attached to at least two poultry perch devices and altogether being tandemly liftable above ground by a wire pully system.

* * * * *